United States Patent [19]

Reinke, Jr.

[11] Patent Number: 4,896,508
[45] Date of Patent: Jan. 30, 1990

[54] ENERGY CONVERTER

[75] Inventor: Karl L. Reinke, Jr., Dundee, Ill.

[73] Assignee: K. Reinke, Jr. & Company, Dundee, Ill.

[21] Appl. No.: 259,710

[22] Filed: Oct. 19, 1988

[51] Int. Cl.⁴ ............................................. F01K 27/00
[52] U.S. Cl. ...................................... 60/648; 237/12.1
[58] Field of Search .................. 60/648, 670; 237/12.1

[56] References Cited

U.S. PATENT DOCUMENTS 3,890,787  6/1975  Margen .................................. 60/648
4,329,847  5/1982  Rastrom ................................ 60/648
4,380,153  4/1983  Ursillo .................................. 60/648

*Primary Examiner*—Allen M. Ostrager
*Attorney, Agent, or Firm*—Wood, Dalton, Phillips, Mason & Rowe

[57] ABSTRACT

An energy converter for providing a plurality of different outputs, including a base, a heating unit mounted to the base, and defining a combustion chamber for combustion of fuel therein, a boiler mounted to the base for receiving products of combustion from the combustion chamber and heating liquid water to form steam therein, a valved steam line for providing steam from the boiler to a steam engine mounted to the base, a generator mounted to the base connected to the engine for generating electricity, a controlled outlet for providing process steam from the boiler, a hot water heater mounted to the base receiving exhaust steam from the engine for heating water therein, and a return line for conducting condensate from the water heater back to the boiler for regeneration of steam therein. The heating unit is arranged to burn a wide range of different fuels. The heating unit is adapted to provide a clean effluent suitable to be used as heated air for convectively heating an enclosed space. In one illustrated example, the heating unit is adapted to burn agricultural waste products, such as corn and the like.

11 Claims, 2 Drawing Sheets

ENERGY CONVERTER

TECHNICAL FIELD

This invention relates to energy conversion and in particular to apparatus for providing energy in a number of different forms from fuel, such as agricultural waste products.

BACKGROUND ART

In conventional agricultural activities, agricultural waste products are produced. In carrying out the activities of an agricultural unit, such as a farm, energy is required in a number of different forms.

More specifically, in agriculture, it is common to use hot water for many different specific purposes.

It is further common in agricultural establishments to utilize electrical energy, such as for lighting and operation of apparatus.

It is common in dairy agriculture to provide cleaning solution in cleaning out the milk lines, etc. High degrees of sanitation must be maintained to avoid contamination of the milk as when flowed through such lines.

It is conventional to obtain the hot water by conventional hot water heaters utilizing conventional fuels, such as fuel oil, gas, etc., or by means of electrical heating coils.

The high cost of such energy adversely affects the profitability of such agricultural enterprises. Further, the use of chemical sterilizing means has not proven completely satisfactory in maintaining the necessary sterilized condition of the lines.

DISCLOSURE OF INVENTION

The present invention comprehends an improved energy conversion means for providing a plurality of different outputs from an energy input source.

In the illustrated embodiment, the energy converter includes a base, means mounted to the base defining a combustion chamber for combustion of fuels therein, boiler means mounted to the base for receiving products of combustion from the combustion chamber and heating liquid water to form steam, means associated with the boiler means for controlledly providing process steam from the boiler means, a steam engine, such as a reciprocating steam engine, a turbine-type steam engine, etc., mounted to the base and having a rotatable output shaft, means for controlledly providing work steam from the boiler means to the steam engine for operation the steam engine to drive the output shaft, an electric generator mounted to the base and having a rotatable input shaft, coupling means coupling the output shaft of the steam engine to the input shaft of the generator for causing the generator to produce an electrical energy output, a water heater mounted to the base and having a serially connected cold water inlet, a heat exchanger, and a heated water outlet, means for conducting exhaust steam from the steam engine to the water heater heat exchange for heating cold water therein to be delivered from the outlet as heated water, and means for conducting steam condensate from the heat exchanger to the boiler means for regenerating steam therefrom in the boiler means.

The invention comprehends the utilization of different combinations of the indicated energy conversion means.

The combustion chamber means, in the illustrated embodiment, comprises means for efficiently burning any of a wide range of different fuels, including, for example, organic matter such as waste agricultural matter.

Illustratively, it has been found advantageous to utilize corn as the fuel in such an energy converter.

In one form, the invention comprehends that the fuel comprise clean burning fuel, permitting the use of the products of combustion as hot air for convectively heating an associated environmental space, such as a greenhouse, or the like.

The invention comprehends that the relatively warm steam condensate from the water heater be returned to the boiler for reuse in forming steam by further heat transfer from the products of combustion.

In the illustrated embodiment, a belt drive is utilized for driving the electrical generator from the steam engine.

The invention further comprehends the provision of means for conducting hot water from the water heater to a fermentation vat for producing alcohol by fermentation of the organic matter therein, and means for burning in the combustion chamber alcohol produced in the fermentation vat.

The energy converter of the present invention is extremely simple and economical of construction, while yet providing the highly improved, highly efficient provision of energy in a multiplicity of different forms from any one of a plurality of different low cost fuels, including agricultural waste fuels.

BRIEF DESCRIPTION OF THE DRAWING

Other features and advantages of the invention will be apparent from the following description take in connection with the accompanying drawing wherein.

BEST MODE FOR CARRYING OUT THE INVENTION

Figure 1:
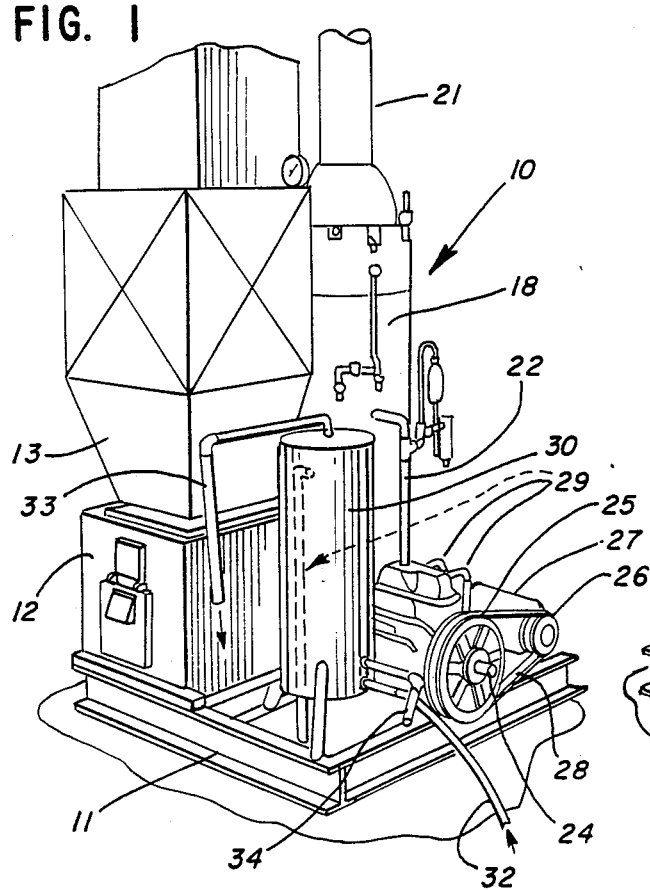
FIG. 1 is a perspective view of an energy converter embodying the invention.

In the illustrative embodiment of the invention as disclosed in the drawing, an energy converter generally designated 10 provides a plurality of different outputs from an energy input fuel source.

Elements of the converter are mounted on a common base 11. As seen in FIG. 1, the energy converter includes a heating unit 12 mounted to the base, with a superposed fuel supply hopper 13 mounted thereon. Heating unit 12 is adapted for burning a wide range of different fuels, including but not limited to agricultural waste products and the like such as chips and wood residues, peat, corn, sawdust, crushed bark, etc. Efficient heating units of this type are commercially available, utilizing a gasification principle providing a complete and efficient combustion at high temperatures and with a high coefficient of efficiency with such diverse fuels. One excellent example of such a heating unit is that manufactured by Sasmo-Högfors, of Kuopio, Finland.

Figure 5:
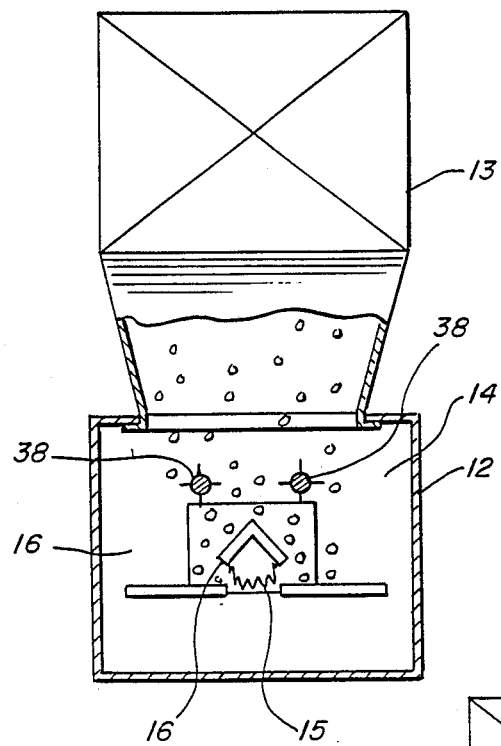
FIG. 5 is a front elevation shown partially in vertical section, illustrating use of the burner unit of FIG. 1 in burning corn.
Figure 6:
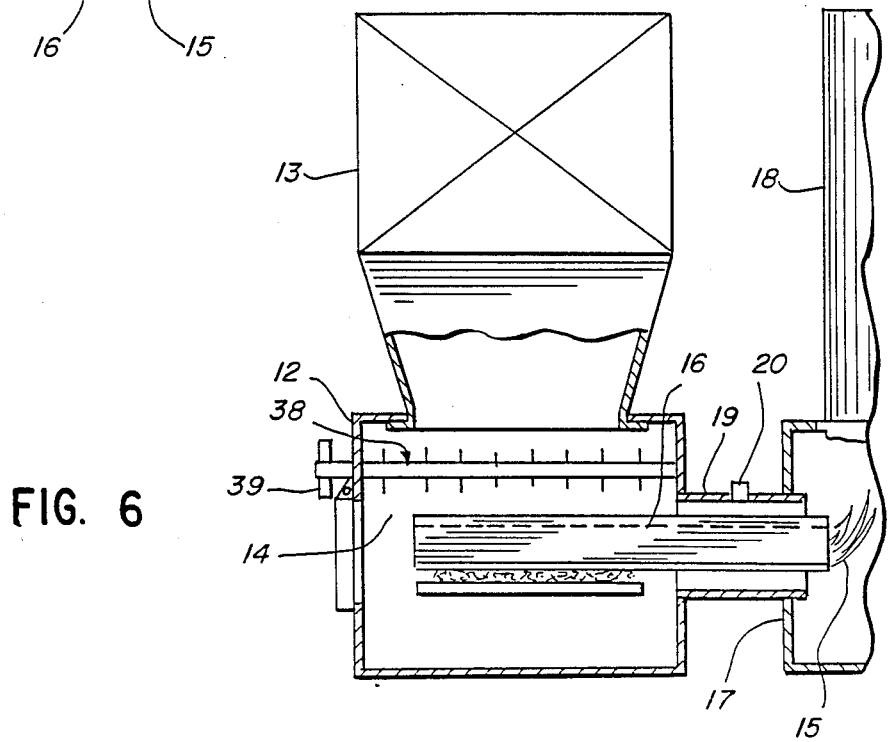
FIG. 6 is a side elevation shown partially in vertical section illustrating the interconnection between the corn burner of FIG. 5 and the combustion chamber means associated with the boiler.

As shown in FIGS. 5 and 6, the heating unit defines a combustion chamber 14 wherein such different forms of fuel may be burned. One such fuel is shown in Chamber 14 to comprise corn.

Agitators 38 are illustratively utilized for agitating the fuel to insure continuous uniform burning thereof, as seen in FIGS. 5 and 6. The agitators may be driven by a suitable belt or chain drive 39, as shown.

As further illustrated in FIGS. 5 and 6, the hot gaseous products of combustion 15 are conducted through a flue tube 16 from the combustion chamber to a firebox 17 associated with a boiler 18. A tubular duct 19 is connected between the heating unit and firebox, with the flue 16 extending therethrough. A connection 20 for providing supplemental air is provided in duct 19 for improved efficiency of combustion.

The products of combustion may be passed outwardly from boiler 18 through an exhaust flue 21. It has been found that the burning of corn produces such a clean effluent that the products of combustion may be used for heating an environmental space, such as the interior of a greenhouse and, thus, the invention comprehends that flue 21 comprise means for conducting the products of combustion to such an environmental space.

Figure 2:
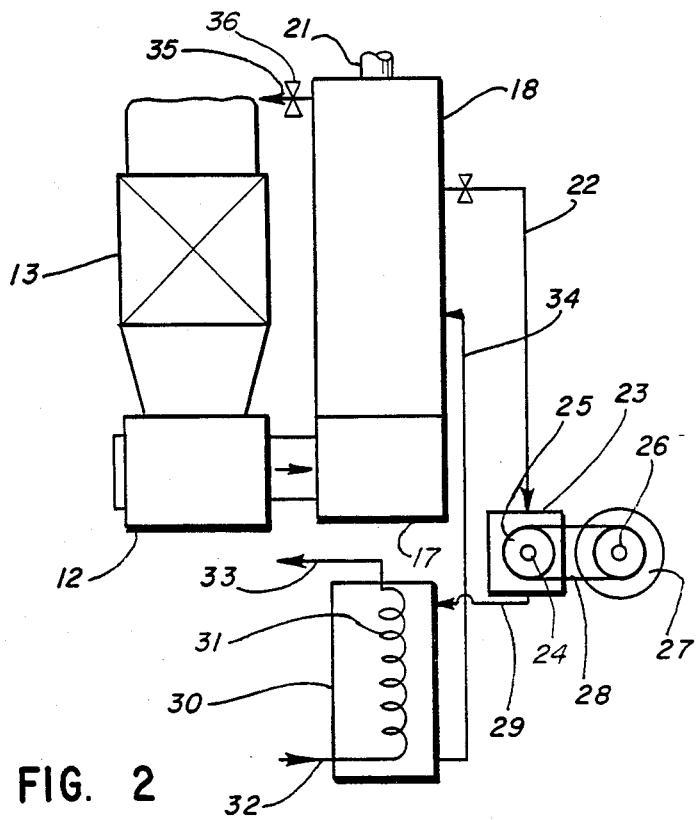
FIG. 2 is a schematic diagram illustrating the interconnections between the filaments of the energy converter of FIG. 1.
Figure 4:
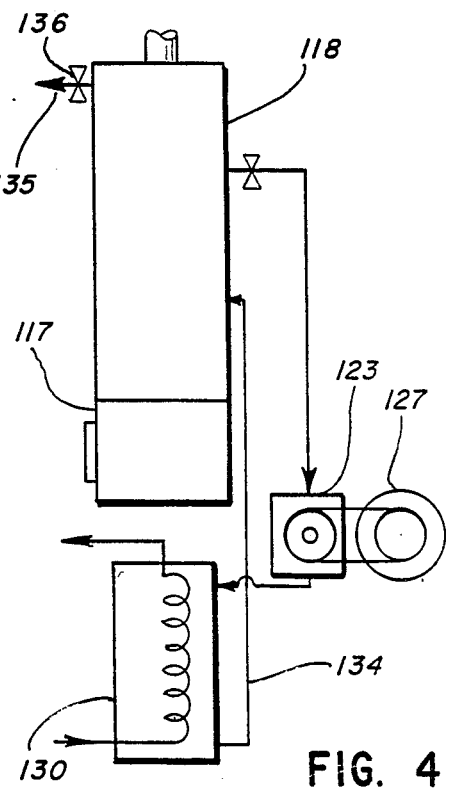
FIG. 4 is a schematic diagram illustrating the interconnection between the elements of the energy converter of FIG. 3.

As shown in FIG. 2, high pressure steam is delivered from boiler 18 through a supply line 22 to a steam engine 23, such as a reciprocating steam engine, a turbine-type engine, etc. The output shaft 24 of the steam engine is provided with a drive pulley 25. An input drive shaft 26 of an electrical generator 27 is connected to the drive pulley 25 by a suitable conventional V-belt 28.

Low pressure exhaust steam is delivered from the steam engine 23 through an exhaust line 29 to a water heater 30.

As illustrated in FIG. 2, the exhaust steam passes through the water heater in heat transfer association with a coil 31 carrying water to be heated delivered thereto from a cold water supply line 32, and delivering the heated water to a hot water delivery line 33. Condensate from the exhaust steam is delivered back to the boiler through a return line 34 for regeneration of steam therefrom in the boiler.

As shown, firebox 17 is mounted to base 11 and supports the boiler 18, whereby the boiler is effectively mounted to the base through the firebox.

Similarly, steam engine 23, electric generator 27, and hot water heater 30 are mounted to the base, whereby the entire energy converter apparatus comprises a single unit adapted to be transported and installed as a unit without the need for effecting interconnections between the separate elements of the converter by the user. Each of the elements of the energy converter are appropriately sized and dimensioned so as to permit such assembled relationship and cooperative functioning.

Figure 3:
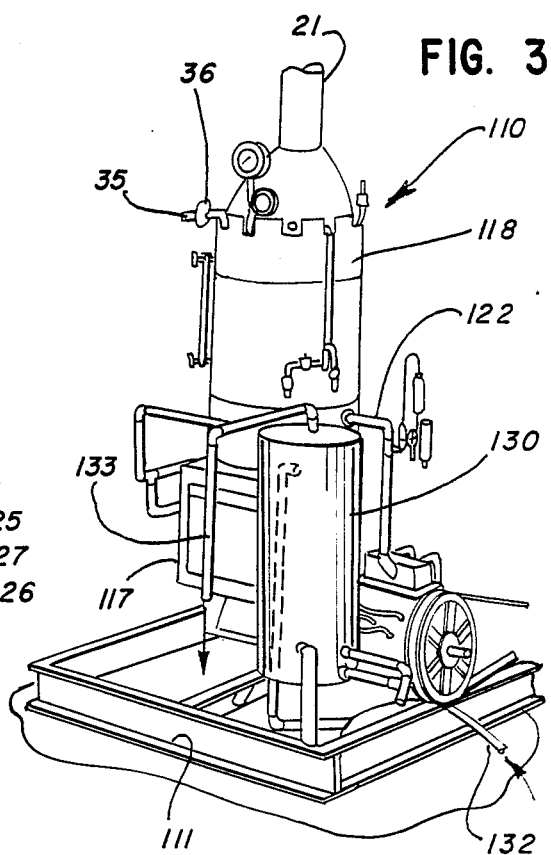
FIG. 3 is a perspective view of a modified form of energy converter embodying the invention.

As shown in FIG. 3, a modified form of energy converter generally designated 110 is shown to comprise an energy converter generally similar to energy converter 10, but wherein fuel is introduced directly into the firebox 117, with the heating unit 12 and hopper 13 being omitted. Thus, conventional fuel, such as logs, coal, fuel oil, etc., may be burned in the firebox 117 for heating the water in boiler 118 directly. In all other respects, the energy converter 110 is similar to energy converter 10 and functions in a similar manner. Elements of converter 110 which are similar to those of converter 10 are identified by similar reference numerals but 100 higher.

A process steam outlet 35 is provided with a suitable manually operable valve 36 for controlledly providing high pressure process steam, such as for sanitizing milk lines and the like. It has been found that the use of such high pressure, high temperature steam provides improved sanitizing of such lines substantially lowering the likelihood of contamination such as from bacterial growth. Thus, the boiler may be used for providing both process steam and work steam, as desired.

In summary, each of energy converters 10 and 110 functions in a similar manner to utilize the heat generated by combustion of fuel in either the heating unit 12 or firebox 117 to generate steam in the boiler 118. The products of combustion effluent are delivered from the boiler through a suitable flue and where the clean-burning fuel, such as corn, is burned in heating unit 12, the products of combustion may be directed to an environmental space for effecting convective heating thereof.

Process steam may be withdrawn from the boiler as desired, such as for use in a sanitizing operation. Work steam may be withdrawn from the boiler to operate a transducer, such as a steam engine, for converting the heat energy of the steam into mechanical energy.

In turn, the mechanical energy may be converted to another form of energy, such as electrical energy, by the association with the steam engine of a suitable generator or the like.

The exhaust steam from the steam engine may be used to heat water in a conventional hot water heater by passing the low pressure steam from the steam engine in heat transfer association with the water conduit in the hot water heater.

The condensate from the water heater may be returned to the boiler for regeneration of steam therefrom in completing a closed steam circuit.

As indicated above, the components of the energy converter are coordinated so as to provide an efficient multiple output energy conversion system which ma be readily transported and installed as desired.

The energy converter is advantageously adapted for agricultural applications where agricultural waste products and the like are readily available for combustion in the heating unit 12, minimizing the cost of the provision of the different forms of energy from the unit.

As will be obvious to those skilled in the art, the output of the transducer 23 may be utilized to drive mechanical apparatus or other devices as well as generator 27, as desired. Where generator 27 is utilized, the electrical energy developed thereby may be utilized as desired by suitable connection of electrical wires to the output of the generator in the normal manner.

As shown in FIGS. 1 and 3, the energy converters of the present invention are extremely compact and are readily transportable for use as desired. The converters may be made in different sizes as desired. In the illustrated embodiment, the base is formed of welded steel beams, it being obvious to those skilled in the art that any suitable base structure may be utilized within the broad scope of the invention.

The foregoing disclosure of specific embodiments is illustrative of the broad inventive concepts comprehended by the invention.

I claim:

1. A self-contained energy converter for providing a plurality of different outputs, said converter comprising:
   a base;
   means mounted to said base defining a combustion chamber for combustion of fuel therein;
   boiler means mounted to said base for receiving products of combustion from said combustion chamber and heating liquid water to form steam, wherein said boiler means includes an exhaust flue for exhausting to an enclosed environmental space the products of combustion delivered thereto from said combustion chamber as hot air for convectively heating said space;
   means associated with said boiler means for controlledly providing process steam from said boiler means;
   a steam engine mounted to said base and having a rotatable output shaft;
   means for controlledly providing work steam from said boiler means to said steam engine for operating said steam engine to drive said output shaft;
   an electric generator mounted to said base and having a rotatable input shaft;
   coupling means coupling said output shaft of the steam engine to said input shaft of the generator for causing said generator to produce an electrical energy output;
   a water heater mounted to said base and having a serially connected cold water inlet, a heat exchanger, and a heated water outlet;
   means for conducting exhaust steam from said steam engine to said water heater heat exchanger for heating cold water therein to be delivered from said outlet as heated water; and
   means for conducting steam condensate from said heat exchanger to said boiler means for regenerating steam therefrom to said boiler means.

2. The energy converter of claim 1 wherein said combustion chamber means comprises means for efficiently burning organic matter.

3. The energy converter of claim 1 wherein said combustion chamber means comprises means for efficiently burning corn.

4. The energy converter of claim 1 wherein said coupling means comprises a belt drive.

5. The energy converter of claim 1 further including a fermentation vat, means for conducting hot water from said water heater to said fermentation vat for producing alcohol by fermentation of organic matter therein.

6. The energy converter of claim 1 further including a fermentation vat, means for conducting hot water from said water heater to said fermentation vat for producing alcohol by fermentation of organic matter therein, said combustion chamber means comprising means for burning alcohol produced in said fermentation vat.

7. The energy converter of claim 1 wherein said means for providing process steam includes connecting means for providing said process steam to a milk conductor pipe line for sterile cleaning thereof.

8. The energy converter of claim 1 wherein said combustion chamber means comprises means for burning agricultural waste products.

9. The energy converter of claim 1 further including means for agitating fuel in said means defining said combustion chamber.

10. A high efficiency, self-contained energy converter for providing a plurality of energy outputs from a single fuel wherein said single fuel comprises corn, said converter comprising:
    a base;
    a heating unit mounted to the base, with a superposed corn supply hopper mounted thereon, said heating unit defining a combustion chamber for combustion of corn received in said hopper;
    boiler means mounted to said base for receiving products of combustion from said combustion chamber and heating liquid water to form steam, wherein said boiler means includes an exhaust flue for exhausting to an enclosed environmental space the products of combustion delivered thereto from said combustion chamber as hot air for convectively heating said space;
    means associated with said boiler means for controlledly providing process steam from said boiler means;
    a steam engine mounted to said base and having a rotatable output shaft;
    means for controlledly providing work steam from said boiler means to said steam engine for operating said steam engine to drive said output shaft;
    an electric generator mounted to said base and having a rotatable input shaft;
    coupling means coupling said output shaft of the steam engine to said input shaft of the generator for causing said generator to produce an electrical energy output;
    a water heater mounted to said base and having a serially connected cold water inlet, a heat exchanger, and a heated water outlet;
    means for conducting exhaust steam from said steam engine to said water heater heat exchanger for heating cold water therein to be delivered from said outlet as heated water; and
    means for conducting steam condensate from said heat exchanger to said boiler means for regenerating steam therefrom to said boiler means.

11. The energy converter of claim 10 further including means for agitating corn in said combustion chamber.

* * * * *